United States Patent [19]

Belart et al.

[11] Patent Number: 4,819,996
[45] Date of Patent: Apr. 11, 1989

[54] AUTOMOTIVE VEHICLE BRAKING DEVICE

[75] Inventors: Juan Belart, Moerfelden-Walldorf, Spain; Hans-Christof Klein, Hattersheim, Fed. Rep. of Germany

[73] Assignee: Alfred Teves GmbH, Frankfurt am Main, Fed. Rep. of Germany

[21] Appl. No.: 76,373

[22] Filed: Jul. 22, 1987

[30] Foreign Application Priority Data

Jul. 30, 1986 [DE] Fed. Rep. of Germany ....... 3625815

[51] Int. Cl.$^4$ ............................ B60T 8/44; B60T 13/52
[52] U.S. Cl. ..................................... 303/114; 60/547.1; 60/554; 60/594; 91/376 R; 188/345; 188/356; 303/50; 303/119
[58] Field of Search .................. 303/113–119, 303/100, 92, 50–56; 60/594, 539, 545, 547.1, 533, 554; 74/110; 188/355–360, 345, 181 All; 91/376 R, 369 All; 220/454, 468, 1 V

[56]  References Cited
U.S. PATENT DOCUMENTS

| 1,899,099 | 2/1933 | Bradbury | 60/547.1 |
| 2,223,424 | 12/1940 | Main | 60/594 X |
| 2,242,096 | 5/1941 | Thomas | 60/594 X |
| 2,281,330 | 4/1942 | Sinclair | 60/594 X |
| 3,109,287 | 11/1963 | Gardner | 188/357 |
| 3,321,917 | 5/1967 | Tenniswood | 60/54.5 |
| 3,463,557 | 8/1969 | Alfieri | 303/52 |
| 4,276,994 | 7/1981 | Spalding | 60/533 X |
| 4,423,597 | 1/1984 | Spielmann | 60/547.1 |
| 4,455,829 | 6/1984 | Seip | 60/547.1 |
| 4,543,790 | 10/1985 | Coll et al. | 60/547.1 |
| 4,576,004 | 3/1986 | Bach | 188/356 X |
| 4,671,066 | 6/1987 | Belart | 60/554 X |
| 4,693,083 | 9/1987 | Reihartz | 60/547.1 |
| 4,702,530 | 10/1987 | Belart et al. | 303/52 X |
| 4,703,978 | 11/1987 | Belart et al. | 303/52 |
| 4,708,401 | 11/1987 | Klein | 303/114 X |
| 4,750,789 | 6/1988 | Belart et al. | 303/114 |

FOREIGN PATENT DOCUMENTS

| 3317629 | 11/1984 | Fed. Rep. of Germany . |
| 1396672 | 3/1965 | France . |
| 1551789 | 11/1968 | France . |
| 707232 | 4/1954 | United Kingdom . |
| 1085284 | 9/1967 | United Kingdom . |
| 2015671 | 9/1979 | United Kingdom . |
| 2017852 | 10/1979 | United Kingdom . |
| 2079390 | 1/1982 | United Kingdom . |
| 2082277 | 3/1982 | United Kingdom . |
| 2128696 | 5/1984 | United Kingdom . |
| 2152610 | 8/1985 | United Kingdom . |
| 2186335 | 8/1987 | United Kingdom | 303/114 |
| 2194008 | 2/1988 | United Kingdom | 303/114 |

Primary Examiner—Douglas C. Butler
Attorney, Agent, or Firm—James B. Raden

[57]  ABSTRACT

An automotive vehicle braking device comprises a hydraulic master cylinder (11) having at least one piston (21) for pressurization of the wheel cylinders connected thereto with hydraulic pressure and also having a vacuum brake force booster (12) inserted between the brake pedal (52) and the piston (21). The master cylinder (11) is integrated in the construction of the vacuum brake force booster (12).

14 Claims, 3 Drawing Sheets

AUTOMOTIVE VEHICLE BRAKING DEVICE

BACKGROUND OF THE INVENTION

The present invention relates to an automotive vehicle braking device and, more particularly, to such a device comprising a hydraulic master cylinder having at least one piston for pressurization of the wheel cylinders connected thereto with hydraulic pressure and further having a vacuum brake force booster inserted between the brake pedal and the hydraulic piston.

In automotive vehicle braking devices of this type (See U.S. application, Ser. No. 009,012 filed Jan. 28, 1987 as a continuation of U.S. application Ser. No. 609,573 filed May 11, 1984; and U.S. Pat. No. 4,659,153), the vaccum brake force booster and the master cylinder form separate components which, though they may be arranged within the engine compartment of an automotive vehicle in close vicinity to each other, occupy a relatively large space. Moreover, the vacuum brake force booster and the master cylinder must be mounted separately.

SUMMARY OF THE INVENTION

An objective of the present invention is to create an automotive vehicle braking device of the type above referred to which shall be of particularly compact construction and which can be mounted rapidly and easily within the engine compartment of an automotive vehicle.

To accomplish this, the invention provides that the master cylinder is integrated in the construction of the vacuum brake force booster. According to the present invention the vacuum brake force booster and the master cylinder thus form a structural unit which can be manufactured with all necessary mechanical and hydraulic connections already made in the factory so that only a single structural unit is mounted in the vehicle. This saves valuable assembly time when mounting the automotive vehicle braking device as proposed by the invention, and, also, the compact arrangement occupies considerably less space within the vehicle than is the case with the known separate arrangment of the vacuum brake force booster and master cylinder.

A particularly compact and easy-to-pressurize arrangement is achieved, if the master cylinder axis extends transverse to and, in particular, perpendicular to the longitudinal axis of the vacuum brake force booster.

It is further convenient, if the master cylinder is accommodated in the part of the housing of the vacuum brake force booster facing away from the vacuum valve.

It is particularly advantageous, if the part of the housing accommodating the master cylinder is designed as die-cast construction, in particular aluminum die-cast construction, and the master cylinder is integrated in such die-cast construction. Due to this design, the respective part of the housing as well as the master cylinder can be manufactured as one unit in a single course of manufacture.

An advantageous structural development of the invention provides that the master cylinder is arranged off-center and next to the central push rod in the vacuum brake force booster. A double-armed reversing lever with offet arms is arranged in the housing part in such manner as to swivel around a transverse axis and kinematically couples the central push rod and the piston rod of the hydraulic piston. In such manner it is easily possible for the master cylinder and the reversing lever to be arranged within the rear vacuum chamber of the vacuum brake force booster. Thus hardly any particular additional space is required for the master cylinder.

For the compact design of all components it is advantageous if, at the side facing away from the vacuum valve, the housing part is formed with a bulge to accommodate the reversing lever. The master cylinder is arranged with at least a substantial portion of its length underneath the bulge at the rear wall and inside the housing part.

An embodiment which is even more compact and even more advantageous with regard to mounting can be achieved, if the valve block for connection of the brake circuits is also arranged at the outside of the housing part. In this regard, the valve block is arranged immediately adjacent to the master cylinder.

Finally, the brake fluid reservoir is also arranged at the outside of the housing part. In this connection the required space can be provided, despite the compact arrangement, by the fact that the brake fluid reservoir is arranged at the outside of the housing part above the valve block in the vicinity of the bulge.

A further object of this invention is to provide a vacuum brake force booster for use in connection with the brake slip control and to arrange the changeover valve necessary for this purpose (See U.S. Pat. No. 4,659,153) in a particularly compact, but nevertheless effective manner within the piston wall of the vacuum brake force booster.

The present invention thus also relates to an automotive vehicle braking device comprising a hydraulic master cylinder having at least one piston for pressurization of the wheel cylinders connected thereto with hydraulic pressure and further comprising a vacuum brake force booster inserted between the brake pedal and the hydraulic piston, wherein an electromagnetically actuated changeover valve is built into the piston wall of the vacuum brake force booster. The changeover valve is used in a slip control system for alternatively connecting the vacuum connecting channel and the atmosphere connecting channel of the vacuum brake force booster to the vacuum chamber(s) and/or the pressure chamber(s), or vice versa.

To create a particularly effective, but nevertheless compact arrangement of the changeover valve within the piston wall, a four-way/two-position double poppet valve with axially sliding valve push rod is provided in the piston wall. Two circular valve seats, arranged axially opposite each other at the piston wall, cooperate with a cup spring sealed all around and arranged with axial play between the valve seats and concentrically with them. The cup spring is axially movable back and forth between two circular valve surfaces while the vacuum line coming from outside and the vacuum channel leading to the vacuum valve open radially outward of the first valve seat and radially inward of the first valve surface. The atmospheric pressure connecting channel coming from the vacuum valve opens radially outward of the second valve seat and radially inward of the second valve surface, and the pressure chamber channel opens radially outward of the second valve surface. The inner chamber is connected radially inward of the valve seats by means of a vacuum connecting channel inside the valve push rod with the vacuum chamber(s).

According to one embodiment, it may be provided that the changeover valve is arranged eccentrically to one side of the longitudinal axis.

It is preferable, however, that the changeover valve be designed concentrically with and around the longitudinal axis, with the valve push rod designed accordingly as hollow body.

In order to ensure a particularly fast reaction when the changeover valve is switched over in case of a beginning brake slip action, a further embodiment provides that radially inside the valve push rod there is provided an annular sealing surface facing the vacuum valve. The annular sealing surface cooperates with the valve retainer of the vacuum valve to form the vacuum cutoff valve. This design enables the atmospheric pressure connecting valve of the standard vacuum valve, as the changeover valve switches over from its idle position to the position in which the brake slip is reduced, to open considerably further than in a normal braking operation. Thus, in case of a brake slip control action, the pressure required to prevent the brake slip action is built up considerably faster in the vacuum chamber(s) than is the case within the pressure chamber(s) of the vacuum brake force booster in a normal braking operation.

BRIEF DESCRIPTION OF THE DRAWING

The present invention is described hereinafter with reference to the accompanying drawings, wherein.

DETAILED DESCRIPTION OF PREFERRED EMBODIMENTS

Figure 1:
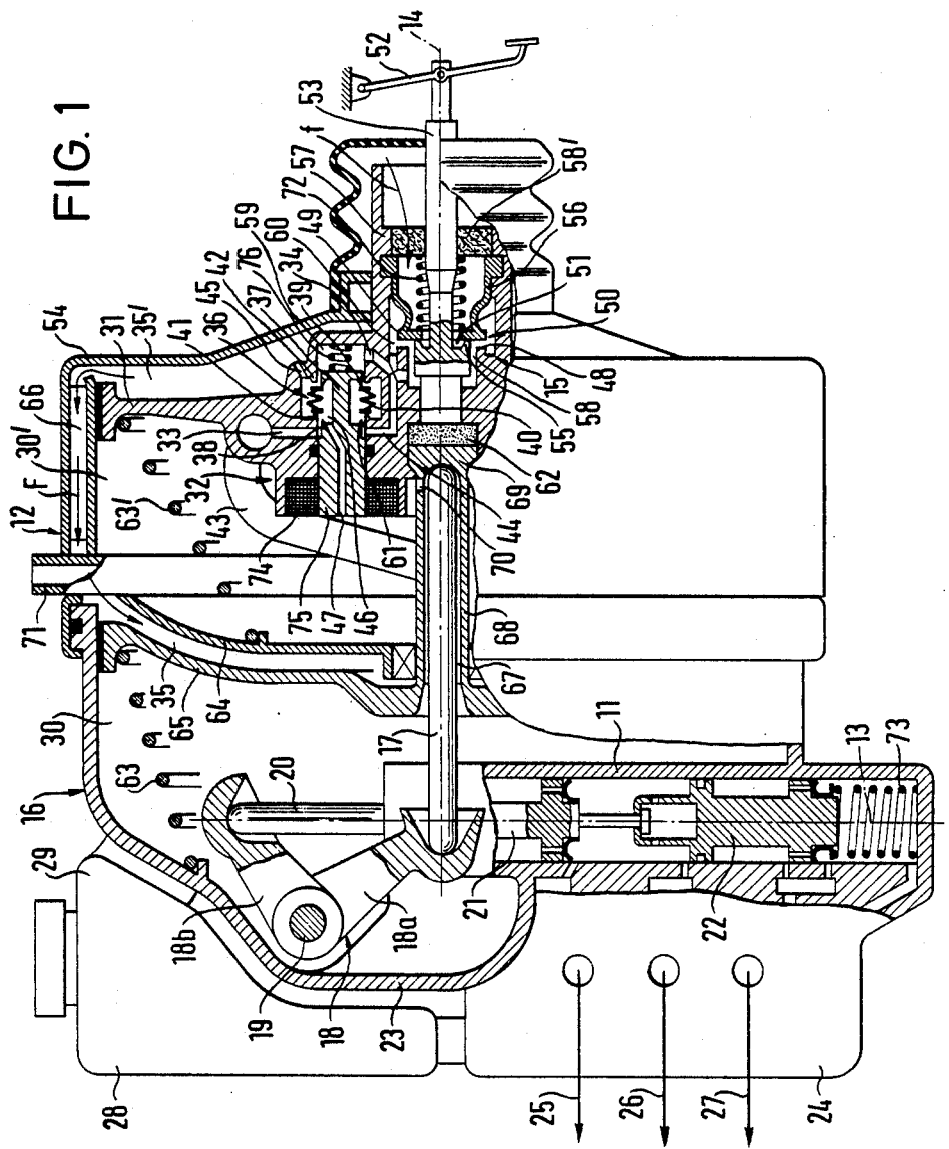
FIG. 1 Shows a diagrammatic longitudinal section of a vacuum brake force booster combined with a master cylinder of an automotive vehicle braking system having brake slip control.

According to FIG. 1, the brake pedal 52 of an automotive vehicle pressurizes the actuating push rod 53 of a vacuum brake force booster 12 comprising two shell-type housing parts 16, 54 mounted together at their open sides. The front housing part 54 is made of sheet metal, while the rear housing part 16 is made of aluminum die-cast metal.

The actuating push rod 53 acts upon the valve ring 55 of a standard vacuum valve 15, while around the valve ring 55 an annular sealing surface 48 is provided which is slightly offset backward.

Axially opposite the annular sealing surface 48 and the valve ring 55 a valve retainer 49 of annular design is located which extends in radial direction so as to cover the valve ring 55 and the annular sealing surface 48. A flexible collar 56 axially foldable like a concertina seals the vavle retainer 49 against the substantially cylindrical piston projection 57 surrounding the actuating push rod 53 with radial play. Between the actuating push rod 53 and the inner wall of the piston projection 57, an annular filter 58' is provided through which atmospheric air can flow into the inside of the flexible collar 56 in the direction of the arrow F, if there is a vacuum.

The chamber 58 radially outward of the valve ring 55, which, however, is located radially inward of the annular sealing surface 48, is connected via an atmospheric pressure connecting channel 34 with the spring accommodating chamber 59 of a changeover valve 32 arranged in the piston wall 31, while the chamber 60 radially outward of the annular sealing surface 48 is connected via a vacuum channel 44 with an annular chamber 61 of the changeover valve 32.

The valve ring 55 is in abutment, via the usual elastic reaction member 62, with the central push rod 17 which rod is located like the actuating push rod 53 on the central longitudinal axis 14 of the vacuum brake force booster 12.

The piston wall 31 sealedly guided radially outward in the housing part 54 separates a pressure chamber 35' facing the actuating push rod 53 from a vacuum chamber 30'. A readjusting spring 63' supported on a fixed internal partition 64 prestresses the piston wall 31 to its idle position as shown in FIG. 1.

Behind the fixed internal partition 64, there is a further piston wall 65 which separates a further pressure chamber 35 from a further vacuum chamber 30 and is axially slidable within the housing part 16 consisting of die-cast metal. A readjusting spring 63 is supported on the rear wall of the housing part 16 and prestresses the piston wall 65 to its idle position as shown in FIG. 1.

The pressure connection of the pressure chamber 35 is ensured via a connecting channel 66 provided radially outward at the housing part 54 in the direction of the arrow F which connects the pressure chambers 35 and 35' with each other. For connection of the two vacuum chambers 30, 30' the piston wall 65 comprises a central sliding hollow pin 68 sealedly guided through the internal partition 64, which hollow pin 68 is fixedly connected with the thrust bearing 69 provide at the reaction member 62 for the central push rod 17. Between the central push rod 17 and the hollow pin 68, there is a cylindrical annular channel 67 which communicates via a radial bore 70 provided close to the thrust bearing 69 with the vacuum chamber 30'.

Thus, the embodiment shows a tandem-type vacuum brake force booster in which the present invention is used in a particularly advantageous manner.

Figure 2:
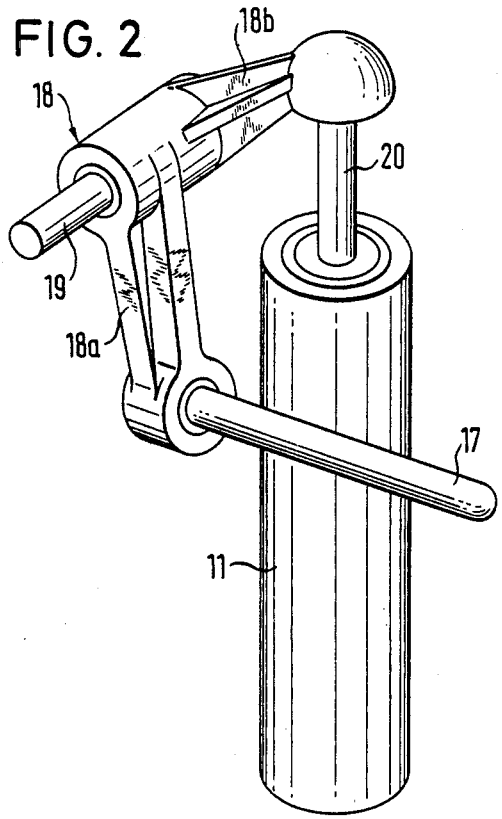
FIG. 2 is a perspective view of the reversing lever used in the embodiment according to FIG. 1 together with the components connected thereto.

The central push rod 17 is joined, at its side facing away from the thrust bearing 69, within the vacuum chamber 30 to an arm 18a of a double-armed reversing lever 18 which is arranged at the housing part 16 in such manner as to swivel around a transverse axis 19. In its idle position as illustrated in FIG. 1, the lever arm 18a forms an angle of approximately 45 degrees with the longitudinal axis 14. At an angle of about 90 degrees with the first arm 18a, the second arm 18b of the reversing lever 18 branches upward. As shown in FIG. 2, the arm 18b is offset relative to the arm 18a in the direction of the transverse axis 19, so that the arms are spaced apart. The end of the arm 18b is joined to the piston rod 20 of a hydraulic master cylinder 11 which cylinder is arranged, with its axis 13 perpendicular to the longitudinal axis 14 and next to the central push rod 17 at the rear wall of the housing part 16. In the embodiment illustrated, the master cylinder 11 is designed as tandem master cylinder in which two pistons 21 and 22 are arranged in tandem which in a customary manner appropriately pressurize several brake circuits 25, 26 and 27. The brake circuits 25, 26, 27 branch off from a valve block 24 provided directly at the rear wall of the housing part 16 adjacent to the tandem master cylinder 11.

The reversing lever 18 is arranged inside a rear bulge 23 of the housing part 16, behind which bulge the lower part of the brake fluid reservoir 28 containing the brake fluid is located. Where the bulge 23 recedes again in the direction óf the actuating push rod 53, the brake fluid reservoir 28 has a bulge 29 increasing its volume.

Because of this design, the master cylinder 11 is completely integrated with the vacuum brake force booster 12 and is arranged primarily in its second vacuum chamber 30. This has the added advantage that not only the reversing lever 18, but also the master cylinder 11 is protected entirely from external influences and dirt.

The vacuum is fed to a port 71 which opens out radially at the rear end of the housing part 54 and is connected via a vacuum line 43 of flexible tube laid in the vacuum chamber 30' with the vacuum connecting channel 33 of the changeover valve 32. In the idle position as illustrated in FIG. 1, th vacuum connecting channel 33 is connected with the vacuum channel 44 leading to the standard vacuum valve 15.

The mode of operation of the arrangement described so far is as follows:

As the brake pedal 52 is pressed down, the valve ring 55 moves toward the left as viewed in FIG. 1, the valve retainer 49 follows such movement due to the action of the spring 72 until it comes to rest against the annular sealing surface forming part of the piston wall 31. Thus the previously existing vacuum connection via the channels 43, 33, 44, 50, 34, 59, 45 toward the pressure chamber 35' is interrupted, since the vacuum cutoff valve 50 provided between the annular sealing surface 48 and the valve retainer 49 closes.

As the actuating push rod 53 is pushed in further, the valve ring 55 lifts off from the valve retainer 49, while the atmospheric pressure connecting valve 51 formed by the valve retainer 49 and the valve ring 55 opens.

Now atmospheric air can enter along the arrow F through the channels 34, 59, 45 into the pressure chamber 35', whereupon a corresponding pressure, which moves the piston wall 31 toward the vacuum chamber 30' connected to the vacuum, is built up in the pressure chamber 35'.

Since the pressure conditions of the chambers 30', 35' also prevail in the chambers 30, 35, the other piston wall 65 is pressurized accordingly. The corresponding pneumatic force is added to the pedal force and acts via the central push rod 17 upon the reversing lever 18 and from there upon the piston rod 20 of the master cylinder 11. The pistons 21, 22 thus move accordingly and thereby build up corresponding pressure in the brake circuits 25, 26, 27.

As the brake pedal 52 is released, the readjusting springs 63, 63' and 73 (in the master cylinder 11) readjust the pistons 21, 22 as well as the piston walls 31, 65 to their initial position, while the processes at the standard vacuum valve 15 are reversed and eventually the vacuum is again supplied to the pressure chambers 35, 35'.

Figure 3:
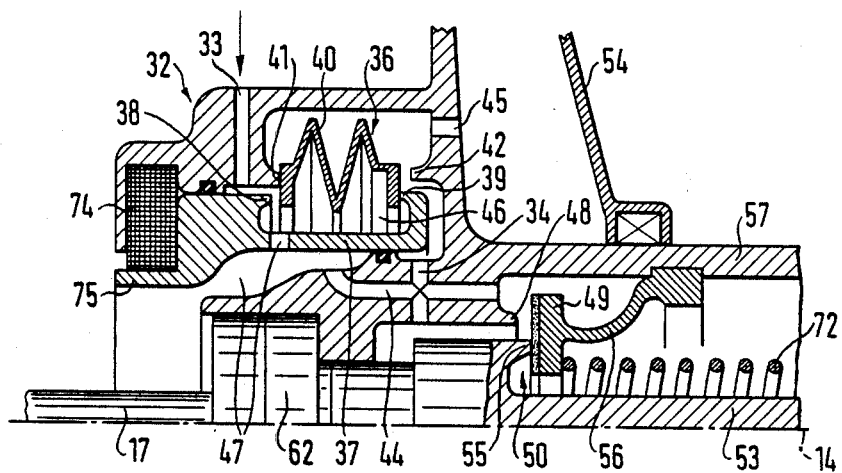
FIG. 3 is an enlarged partial longitudinal section of a second embodiment of the invention showing a concentrically arranged changeover valve; and, FIG. 4 shows a sectional view similar to that of FIG. 1 of a third embodiment which provides a particularly fast reaction of the vacuum brake force booster when the changeover valve switches over as a brake slip action occurs.

Referring to FIGS. 1 and 3, the changeover valve 32 built into the piston wall 31 is a double poppet valve 36 with a valve push rod 37 which is arranged within the body of the double poppet valve 36 parallel to the longitudinal axis 14 and movable to a limited extend in that direction. The valve push rod 37 comprises two circular valve seats 38, 39 located axialy opposite each other and radially inward of which there is a cylindrical inner chamber 46 which is connected by a vacuum connecting channel 47 in the valve push rod 37 with the vacuum chamber 30'.

Radially outward of the valve seats 38, 39 and slightly axially offset in the direction of the actuating push rod 53 there are circular valve surfaces 41, 42. These surfaces 41, 42 are provided at the body of the double poppet valve 36 and are fixedly connected with the piston wall 31. The valve surfaces 41, 42 are arranged axially concentrically opposite each other and a cup spring 40 is sealed all aournd between them and is arranged with slight axial play. The cup spring 40 comprises at each front side, a sealing disc of annular design that extends radially over the valve seats 38, 39 and the valve surfaces 41, 42.

From the chamber radially outward of the cup spring 40, pressure chamber channel 45 runs to the pressure chamber 35'.

At its side facing the vacuum chamber 30', the changeover valve 32 includes an electromagnet 74 which surrounds an armature 75 coaxial with the valve push rod 37 and fixed to it. The electromagnet is connected (in a manner not shown) to a brake slip control device and, when brake slip control occurs, is supplied with an electric signal. When the signal is received, the valve push rod 37 s moved from its idle position established by the readjusting spring 76 as illustrated in the drawing toward the right as viewed in FIG. 1. During this movement to the other end position, the valve seat 38 bears on the cup spring 40 so that it lifts off from the valve surface 41 and is pressed against the valve surface 42 when the valve seat 39 moves away from the cup spring 40.

The mode of operation of the changeover valve 32 is as follows:

Assume that a braking operatin is in process, i.e. that the brake pedal 52 is more or less pressed down and the piston walls 31, 65 are in an intermediate position between the idle position as illustrated in FIG. 1 and the end position to the left of the idle position. When the electromagnet 74 is not excited, the double poppet valve 36 adopts the position shown in FIG. 1 in which—as is desired in a normal braking operation—the vacuum is supplied only to the vacuum chambers 30, 30' and atmospheric pressure is supplied to the pressure chambers 35, 35'.

If an electric pulse is now fed to the electromagnet 74, the armature 75 and with it the valve push rod 37 moves to the right as viewed in FIG. 1 which causes the vacuum connecting channel 33 to be connected past the valve surface 41 via the pressure chamber channel 45 to the pressure chambers 35, 35', while the vacuum chambers 30, 30' are cut off from the vacuum due to the fact that the valve seat 39 comes to lie against the cup spring 40, while the valve seat lifts off from the cup spring 40 causing the atmosphere connecting channel 34 to be connected to the inner chamber 46 so that atmospheric pressure enters through the vacuum connecting channel 47 into the vacuum chambers 30, 30'. Thus, the pressure changeover necessary for brake slip control has taken place. In general this changeover takes place periodically until the slip action that has occurred is eliminated. Finally, the changeover valve 32 returns to the idle position as shown in FIG. 1

In the following figures, like reference numerals relate to components of corresponding design and function as in FIG. 1.

Whereas in the embodiment shown in FIG. 1 the changeover valve 32 is arranged eccentrically relative to the longitudinal axis 14 to one side thereof in the piston wall 31, FIG. 3 shows a design and arrangement of the changeover valve 32 that is concentric with the longitudinal axis 14. Therein, all components and in particular the cup spring 40, the electromagnet 74, the armature 75, the valve push rod 37 are arranged like a ring around the longituinal axis 14 and the components arranged along it.

Figure 4:
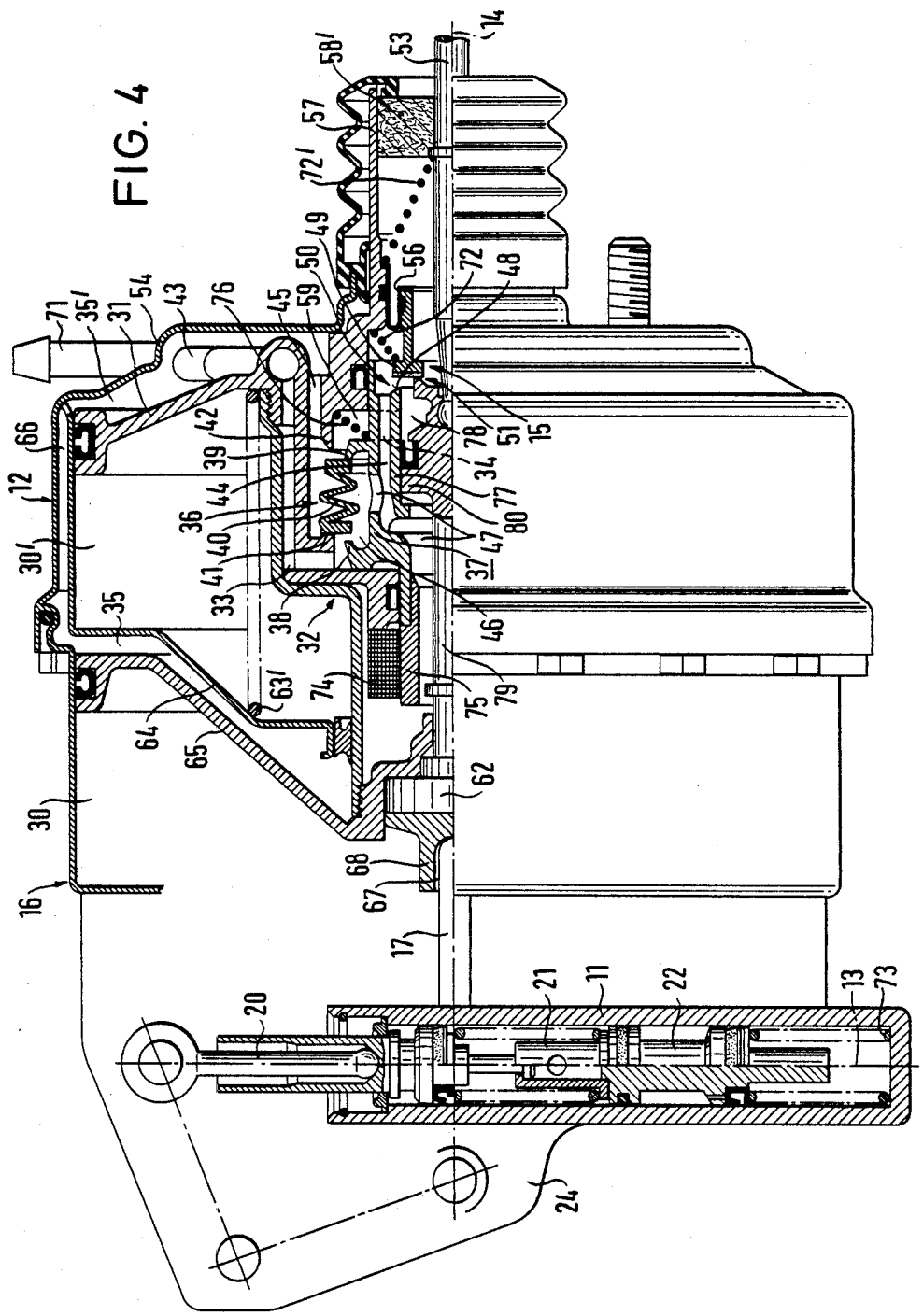

According to FIG. 4, a spring 75' between the actuating push rod 53 and the piston projection 57 is active in a manner readjusting the actuating push rod 53.

In this embodiment, the annular sealing surface 48 is not fixedly connected with the piston wall 31, but is formed at an inner ring 77 which is an integral part of the valve push rod 37.

The vacuum channel 44 is connected from the annular chamber 78 provided behind the atmospheric pressure connecting valve 51 via an atmosphere connecting channel 34 with a spring accommodating chamber 59. The vacuum channel 44 inside the valve push rod 37 between the actual valve body and the inner ring 77 is fixed radially inward thereof and leads to the vacuum cutoff valve 50.

Apart from the fact that it is of very compact construction, the embodiment according to FIG. 4 has the advantage that in case of electromagnetic actuation of the double poppet valve 36, the inner ring 77, then in contact with the valve retainer 49 by means of the annular sealing surface 48, jerks the valve retainer 49 against the force of the spring 72 in the direction of the filter 58' whereby the atmospheric pressure connecting valve 51 is jerked further open. Thus, the atmospheric pressure can reach the vacuum chambers 30, 30' much faster than is the case in the embodiments described before.

A further special feature of the embodiment according to FIG. 4 is that the reaction member 62 has been placed in the second piston wall 65. A mechanical connecting member 79 connects the reaction member 62 with the push rod 53. The inner ring 77 is axially sealedly and slidingly arranged at a radial projection 80 of the mechanical connecting member 79. The annular chamber 78 is located before, the vacuum connecting channel 47 behind the radial projection 80.

What is claimed is:

1. Automotive vehicle braking device comprising a hydraulic master cylinder having at least one piston therein for pressurizing the wheel cylinders connected thereto, and a vacuum brake force booster for coupling a brake pedal and the hydraulic piston, said master cylinder being integral with the construction of the vacuum brake force booster, wherein said vacuum brake force booster is enclosed in a metal housing which opens in the longitudinal direction of said housing on the side thereof facing away from said brake pedal and wherein said brake force booster includes a central push rod operatively coupled to said brake pedal and extending along said longitudinal direction, wherein said master cylinder is integrally formed with a die-cast housing which opens towards and is joined with said metal housing at the opening thereof and wherein said master cylinder includes a piston rod extending in the longitudinal direction of said master cylinder and generally transverse to the longitudinal direction of said master cylinder and generally transverse to the longitudinal direction of the brake force booster housing, a reversing lever pivotally mounted in said die-cast housing and having a first lever arm for engaging said central push rod and a second lever arm for engaging said piston rod wherein translation of said push rod translates said piston rod, and a fixed internal portion coaxially mounted about the axis of said central push rod and internally separating the integral housing formed by said metal housing and said die-cast housing.

2. Automotive vehicle braking device in accordance with claim 1 wherein the axis of the master cylinder extends transverse to the longitudinal axis of the vacuum brake force booster.

3. Automotive vehicle braking device in accordance with claim 2 wherein the master cylinder is accommodated in part of the housing of the vacuum brake force booster, a vacuum valve forms part of the vacuum brake booster and the master cylinder is accommodated in that part of the housing facing away from the vacuum valve.

4. Automotive vehicle braking device in accordance with claim 3 wherein at the side facing away from said vacuum valve, the housing part includes a bulge to accommodate the reversing lever, the master cylinder is arranged with at least a substantial portion of its length underneath the bulge at the rear wall and inside the housing part.

5. Automotive vehicle braking device in accordance with claim 3 wherein a valve block for connection of brake circuits to the master cylinder is arranged at the outside of the housing part.

6. Automotive vehicle braking device in ccordance with claim 5, wherein the valve block is arranged immediately adjacent to the master cylinder.

7. Automotive vehicle braking device in accordance with claim 5 wherein a brake fluid reservoir is also arranged at the outside of the housing part.

8. Automotive vehicle braking device in accordance with claim 7 wherein the brake fluid reservoir is arranged at the outside of the housing part above the valve block in the vicinity of the bulge.

9. Automotive vehicle braking device in accordance with claim 8 wherein the bulge recedes again in the direction of the vacuum valve above the lever, in order to create additional space there for a bulge formed in the brake fluid reservoir.

10. Automotive vehicle braking device in accordance with claim 1 wherein the master cylinder and said reversing lever are arranged inside a vacuum chamber of the vacuum brake force booster.

11. Automotive vehicle braking device comprising a hydraulic master cylinder and a vacuum brake force booster arranged in an integral housing, said vacuum brake force booster including vacuum and pressure chambers, a piston and a vacuum valve, an electromagnetically actuated changeover valve built into a wall of the piston for operation by a brake slip control system for alternatively connecting a vacuum channel and an atmosphere connecting channel to the vacuum chamber and/or the pressure chamber, said brake slip control system including control circuitry for switching the changeover valve such that a beginning brake slip action is corrected, said changeover valve comprising a four-way/two-position double poppet valve with an axially sliding valve push rod provided in the piston wall, two circular valve seats arranged axially opposite each other, said valve seats cooperating with a cup spring sealed all around and arranged with axial play between and concentrically with the valve seats, said sup spring being axially movable back and forth between two circular valve surfaces axially provided at the piston wall, a vacuum line coming from outside and the vacuum channel leading to the vacuum valve open radially outward of a first of the valve seats and radially inward of a first of the valve surface, the atmospheric pressure connecting channel coming from the vacuum valve opens radially outward of the second of the valve seats and radially inward of the second of the valve surfaces, and the pressure chamber channel opens radially outward of the second valve surface, and an inner chamber connected radially inward of the two valve seats by means of a vacuum connecting channel located inside the sliding valve push rod with the vacuum chambers.

12. Automotive vehicle braking device in accordance with claim 11 wherein the changeover valve is arranged eccentrically to one side of the longitudinal axis.

13. Automotive vehicle braking device in accordance with claim 11 wherein the changeover valve is located concentrically with and around the longitudinal axis with the valve push rod formed as a hollow body.

14. Automovite vehicle braking device in accordance with claim 13 wherein the valve push rod comprises, radially inside, an annular sealing surface facing the vacuum valve, said annular sealing surface cooperating with a valve retainer of the vacuum valve to form the vacuum cutoff valve.

* * * * *